(No Model.)

J. FISCHER.
CAR BRAKE.

No. 452,368. Patented May 19, 1891.

Witnesses  
Inventor  
Joseph Fischer,  
By his Attorneys,

UNITED STATES PATENT OFFICE.

JOSEPH FISCHER, OF CLEVELAND, OHIO.

CAR-BRAKE.

SPECIFICATION forming part of Letters Patent No. 452,368, dated May 19, 1891.

Application filed October 29, 1890. Serial No. 369,690. (No model.)

*To all whom it may concern:*

Be it known that I, JOSEPH FISCHER, a citizen of the United States, residing at Cleveland, in the county of Cuyahoga and State of Ohio, have invented a new and useful Car-Brake, of which the following is a specification.

This invention relates to railroad-car brakes; and it has for its object to provide a device of the class which shall be simple in construction, inexpensive, and which may be easily applied to the trucks of street or railroad cars, and which shall apply the pressure of the brakes from the center of the truck to the inner faces of the wheels in such a manner that the pressure upon the wheels shall be perfectly equalized, thus rendering the operation rapid and effective.

The invention consists in the improved construction, arrangement, and combination of parts, which will be hereinafter fully described, and particularly pointed out in the claims.

Figure 1:
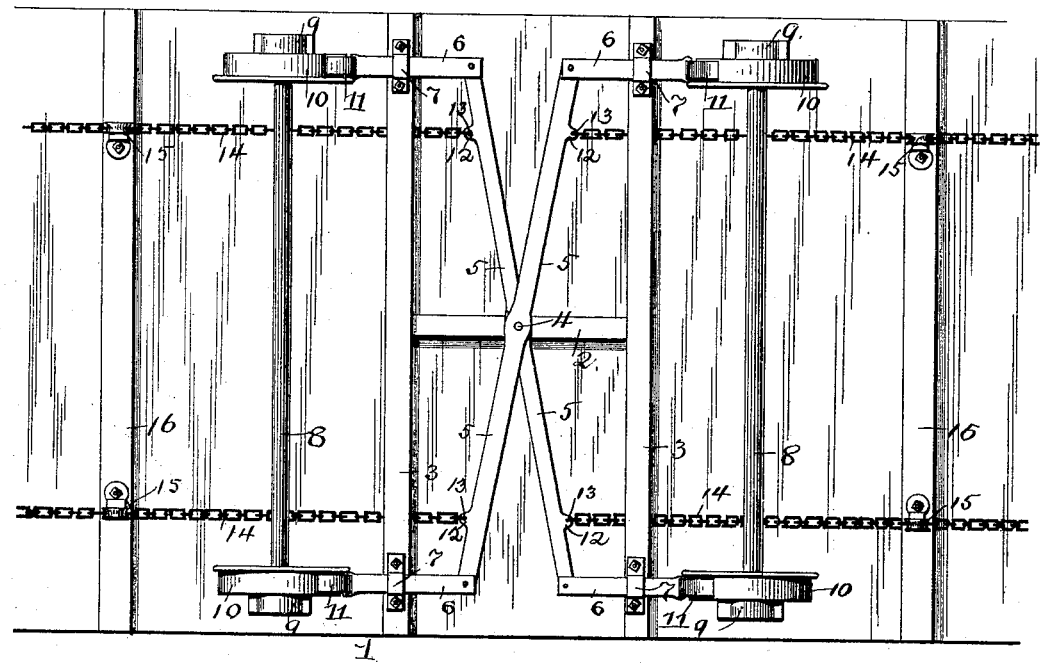
Figure 2:
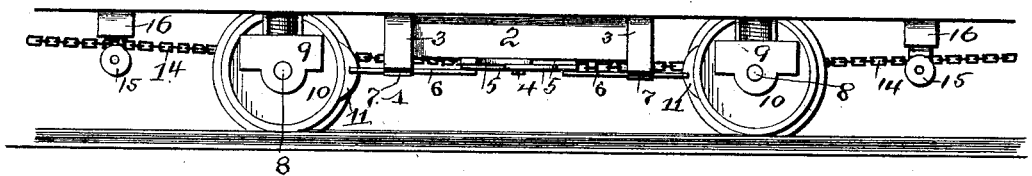

In the drawings hereto annexed, Figure 1 is a bottom plan view of a truck equipped with my improved brake mechanism. Fig. 2 is a side elevation of the same.

Like numerals of reference indicate like parts in both figures.

In the drawings hereto annexed, 1 designates the truck, which is constructed with a longitudinal center-beam 2, connecting the transverse brace-pieces 3 3. Upon a vertical bolt 4, which is mounted centrally in the beam 2, are pivoted a pair of levers 5 5, crossing each other and extending outwardly nearly to the sides of the truck. To the outer ends of the levers 5 5 are pivoted the link-rods 6, which are mounted slidingly in brackets 7 upon the under sides of the cross beams or braces 3.

8 8 designate the axles, which are mounted in the usual manner in boxes 9 and which carry the wheels 10, which are of the usual construction. The outer ends of the link-rods 6 carry the brake-shoes 11, which are adapted to press or bear against the treads of the wheels, when the link-rods 6, by the action of the levers 5, are forced in an outward direction. The levers 5 are provided near their outer ends and on opposite sides with projections 12, having eyes or perforations 13, to which are attached the operating-chains 14. The latter are guided over pulleys 15, which are journaled in suitable bearings on the under sides of cross bars or braces 16 of the truck and are attached to suitable operating-levers; or, if preferred, to suitably-arranged shafts, upon which the said chains may be wound for the purpose of operating the brakes. These operating shafts or levers may be of any suitable well-known construction, and as they form no part of my present invention they have not been shown in the drawings hereto annexed.

The operation of my invention will be readily understood from the foregoing description, taken in connection with the drawings hereto annexed. By pulling the chains 14 at one end of the car or truck the levers 5 will be simultaneously operated to force the link-rods 6 in an outward direction, thus forcing the brake-shoes 11 into contact with the treads of the wheels. The pressure upon the wheels will be perfectly equalized, and the revolution of the wheels will thus be speedily checked without any sudden jarring or jolting.

The construction of my improved brake mechanism is exceedingly simple, and it may be readily applied at a moderate expense to car-trucks of ordinary construction.

Having thus described my invention, I claim and desire to secure by Letters Patent of the United States—

1. In a car-brake, the combination, with the truck, of a pair of levers pivoted centrally under the same and crossing each other, and the link-rods pivoted at the outer ends of said levers and carrying brake-shoes adapted to bear against the inner faces of the wheels, substantially as and for the purpose set forth.

2. In a car-brake, the combination, with the truck, of the levers pivoted centrally under the same, the link-rods pivoted to the outer ends of the said levers, the supporting-brackets mounted under the cross-beams of the truck and forming bearings for the link-rods, and the brake-shoes at the outer ends of the latter adapted to bear against the inner faces of the wheels, substantially as set forth.

3. In a car-brake, the combination of the truck, the levers pivoted centrally under the same and provided with perforated lugs or eyes on opposite sides near their outer ends, the link-rods pivoted at the outer ends of the levers, mounted slidingly in suitable bearings or supporting-brackets, and carrying brake-shoes at their outer ends, and the operating-chains connected with the eyes of the main levers and passing over suitable guide-pulleys, substantially as and for the purpose set forth.

In testimony that I claim the foregoing as my own I have hereto affixed my signature in presence of two witnesses.

JOSEPH FISCHER.

Witnesses:
MAX FISCHER,
P. C. McILRATH.